(12) United States Patent
Takahashi et al.

(10) Patent No.: US 12,075,336 B2
(45) Date of Patent: Aug. 27, 2024

(54) USER EQUIPMENT TO PERFORM ACCESS TO A CELL

(71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 325 days.

(21) Appl. No.: 17/441,088

(22) PCT Filed: Mar. 27, 2019

(86) PCT No.: PCT/JP2019/013465
§ 371 (c)(1),
(2) Date: Sep. 20, 2021

(87) PCT Pub. No.: WO2020/194634
PCT Pub. Date: Oct. 1, 2020

(65) Prior Publication Data
US 2022/0191770 A1    Jun. 16, 2022

(51) Int. Cl.
*H04W 48/08* (2009.01)
*H04W 48/16* (2009.01)

(52) U.S. Cl.
CPC ........... *H04W 48/08* (2013.01); *H04W 48/16* (2013.01)

(58) Field of Classification Search
CPC ..... H04W 48/08; H04W 48/16; H04W 76/00; H04W 48/10; H04W 48/02; H04W 48/12; H04B 1/7075
See application file for complete search history.

(56) References Cited

U.S. PATENT DOCUMENTS

| | | | | |
|---|---|---|---|---|
| 2017/0289965 A1* | 10/2017 | You | ....................... | H04W 52/02 |
| 2017/0303241 A1* | 10/2017 | Yang | ....................... | H04L 5/001 |
| 2020/0221372 A1* | 7/2020 | Shih | ....................... | H04W 48/18 |
| 2021/0258857 A1* | 8/2021 | Won | ....................... | H04W 48/18 |
| 2022/0124543 A1* | 4/2022 | Orhan | ..................... | G06N 3/006 |
| 2022/0159561 A1* | 5/2022 | Takahashi | ............. | H04W 48/18 |
| 2022/0174745 A1* | 6/2022 | Lee | ..................... | H04W 74/006 |

OTHER PUBLICATIONS

3GPP TR 23.734 V16.1.0, Mar. 25, 2019 pp. 14-25 (Year: 2019).*
Office Action issued in the counterpart Chinese Patent Application No. 201980094430.5, mailed on Aug. 28, 2023 (24 pages).
Office Action issued in the counterpart Japanese Patent Application No. 2021-508575, mailed on Nov. 15, 2022 (5 pages).
(Continued)

*Primary Examiner* — Mewale A Ambaye
(74) *Attorney, Agent, or Firm* — Osha Bergman Watanabe & Burton LLP

(57) ABSTRACT

A user equipment includes a receiving unit configured to receive system information from a cell, a control unit configured to determine, based on an information element and identifiers, whether or not the cell is a candidate to be selected, the information element indicating other uses included in the system information and identifiers being of a plurality of closed access groups (CAGs) identifying groups of subscribers who are allowed to access the cell, and a communication unit configured to perform access to the cell in a case in which the control unit determines that the cell is the candidate to be selected.

5 Claims, 6 Drawing Sheets

(56) References Cited

OTHER PUBLICATIONS

ETSI TS 138 304 V15.2.0; "5G; NR; User Equipment (UE) procedures in idle mode and in RRC Inactive state (3GPP TS 38.304 version 15.2.0 Release 15)"; Apr. 2019 (30 pages).
International Search Report issued in PCT/JP2019/013465, mailed on May 7, 2019 (3 pages).
Written Opinion of the International Searching Authority issued in PCT/JP2019/013465, mailed on May 7, 2019 (4 pages).
3GPP TS 38.300 V15.4.0; "3rd Generation Partnership Project; Technical Specification Group Radio Access Network; NR; NR and NG-RAN Overall Description; Stage 2 (Release 15)"; Dec. 2018 (97 pages).
3GPP TS 22.261 V16.6.0; "3rd Generation Partnership Project; Technical Specification Group Services and System Aspects; Service requirements for the 5G system; Stage 1 (Release 16)"; Dec. 2018 (73 pages).
3GPP TR 23.734 V16.1.0; "3rd Generation Partnership Project; Technical Specification Group Services and System Aspects; Study on enhancement of 5G System (5GS) for vertical and Local Area Network (LAN) services (Release 16)"; Mar. 2019 (18 pages).
Office Action issued in Chinese Application No. 201980094430.5; Dated Mar. 1, 2024 (15 pages).
Office Action issued in the counterpart Japanese Patent Application No. 2023-083933, mailed on May 21, 2024 (8 pages).
3GPP TS 38.304 V15.2.0; "3rd Generation Partnership Project; Technical Specification Group Radio Access Network; NR; User Equipment (UE) procedures in idle mode and RRC inactive state (Release 15)"; Dec. 2018 (7 pages).

\* cited by examiner

USER EQUIPMENT TO PERFORM ACCESS TO A CELL

TECHNICAL FIELD

The present invention relates to a user equipment in a wireless communication system.

BACKGROUND ART

In New Radio (NR) (also referred to as "5G") which is a successor system of Long Term Evolution (LTE), a technology satisfying a large-capacity system, a high-speed data transmission rate, a low delay, simultaneous connection of multiple terminals, a low cost, power saving, and the like is under review (for example, Non-Patent Document 1).

In an NR wireless communication system, support for a non-public network (NPN) is under review (for example, Non-Patent Document 2). In the non-public network, for example, there is a case in which it is supported by a stand-alone non-public network (SNPN) and is a case in which a public network and a non-public network are integrated and supported.

CITATION LIST

Non-Patent Document

Non-Patent Document 1: 3GPP TS 38.300 V15.4.0 (2018-12)
Non-Patent Document 2: 3GPP TS 22.261 V16.6.0 (2018-12)

SUMMARY OF THE INVENTION

Problem to be Solved by the Invention

In the NR wireless communication system, in a cell in which a non-public network is supported, it is desirable that the non-public network be supported and only a user equipment having subscriber information be connectable. However, a user equipment that is unable to establish a connection with the cell that supports the non-public network is likely to make an attempt to access the cell.

The present invention was made in light of the foregoing, and it is an object of the present invention to perform access restrictions on the cell that supports the non-public network in the wireless communication system.

Means for Solving Problem

According to the disclosed technique, a user equipment including a receiving unit configured to receive system information from a cell, a control unit configured to determine, based on an information element and identifiers, whether or not the cell is a candidate to be selected, the information element indicating other uses included in the system information and identifiers being of a plurality of closed access groups (CAGs) identifying groups of subscribers who are allowed to access the cell, and a communication unit that performs access to the cell in a case in which the control unit determines that the cell is the candidate to be selected is provided.

Effect of the Invention

According to the disclosed technology, it is possible to perform access restrictions on the cell that supports the non-public network in the wireless communication system.

MODE(S) FOR CARRYING OUT THE INVENTION

Hereafter, exemplary embodiments of the present invention will be described with reference to the appended drawings. Embodiments to be described below are an example, and embodiments to which the present invention is applied are not limited to the following embodiments.

The existing technology is appropriately used for an operation of a wireless communication system of an embodiment of the present invention. Here, the existing technology is, for example, the existing LTE but is not limited to the existing LTE. The term "LTE" used in this specification has a broad meaning including LTE-Advanced and schemes after LTE-Advanced (for example, NR) unless otherwise specified.

Also, in an embodiment of the present invention to be described below, terms such as a synchronization signal (SS), a primary SS (PSS), a secondary SS (SSS), a physical broadcast channel (PBCH), a physical random access channel (PRACH) used in the existing LTE are used. This is for convenience of description, and signals, functions, or the like similar to them may be indicated by other names. The above terms in NR correspond to NR-SS, NR-PSS, NR-SSS, NR-PBCH, NR-PRACH, and the like. However, even a signal used for NR is not always indicated by "NR-".

Also, in an embodiment of the present invention, a duplex scheme may be a Time Division Duplex (TDD) scheme, may be a Frequency Division Duplex (FDD) scheme, or may be other schemes (for example, Flexible Duplex or the like).

Further, in an embodiment of the present invention, when a radio parameter or the like is "configured", it may mean that a predetermined value is pre-configured or may mean that a radio parameter indicated by a base station device 10 or a user equipment 20 may be configured.

Figure 1:
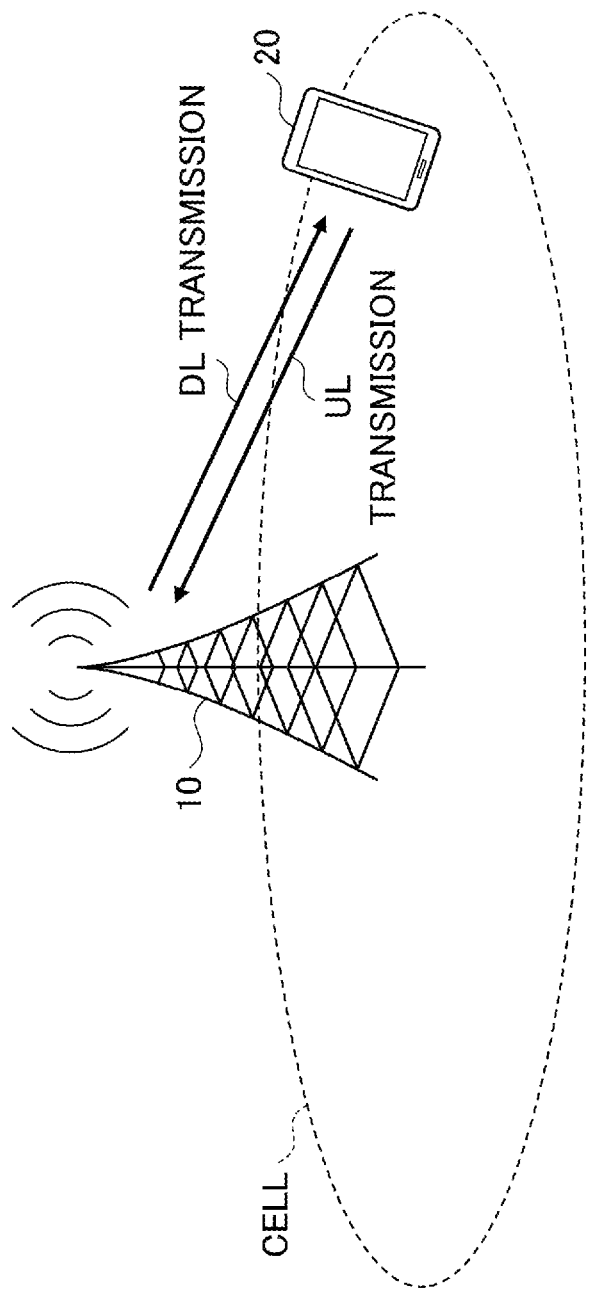
FIG. 1 is a diagram for describing a wireless communication system in an embodiment of the present invention.

FIG. 1 is a diagram for describing a wireless communication system in an embodiment of the present invention. The wireless communication system in the embodiment of the present invention includes a base station device 10 and a user equipment 20 as illustrated in FIG. 1. Although one base station device 10 and one user equipment 20 are illustrated in FIG. 1, this is an example, and a plurality of base station devices or a plurality of user equipments may be arranged.

The base station device 10 is a communication device that provides one or more cells and performs wireless communication with the user equipment 20. Physical resources of wireless signals may be defined by a time domain and a frequency domain, the time domain may be defined by the number of OFDM symbols, and the frequency domain may be defined by the number of subcarriers or the number of resource blocks. The base station device 10 transmits a synchronization signal and system information to the user equipment 20. The synchronization signal is, for example, NR-PSS and NR-SSS. For example, the system information is transmitted through an NR-PBCH and is also referred to as broadcast information. As illustrated in FIG. 1, the base station device 10 transmits control signal or data to the user equipment 20 by downlink (DL) and receives a control signal or data from the user equipment 20 by uplink (UL). Both the base station device 10 and the user equipment 20 can transmit and receive signals by performing beam forming. Both the base station device 10 and the user equipment 20 can apply communication according to multiple input multiple output (MIMO) to DL or UL. Further, both the base station device 10 and the user equipment 20 may perform communication via a secondary cell (SCell) and a primary cell (PCell) by carrier aggregation (CA).

The user equipment 20 is a communication device with a wireless communication function such as a smartphone, a mobile phone, a tablet, a wearable terminal, or a M2M (machine-to-machine) communication module. As illustrated in FIG. 1, the user equipment 20 uses various kinds of communication services provided by the wireless communication system by receiving a control signal or data from the base station device 10 by DL and transmitting a control signal or data to the base station device 10 by UL.

In the NR wireless communication system, a non-public network (NPN) using a 5G core network is under review. The non-public network is assumed to be used in private organizations such as companies. For example, the non-public network is arranged as a standalone network and is provided by a certain public land mobile network (PLMN) or provided by a PLMN slice. For example, an unauthorized user equipment 20 that does not belong to a company may not attempt to establish a connection with the non-public network.

In the non-public network, there is a case in which it is supported by a stand-alone non-public network (SNPN) and is a case in which a public network (PN) and a non-public network are integrated and supported.

Figure 2:
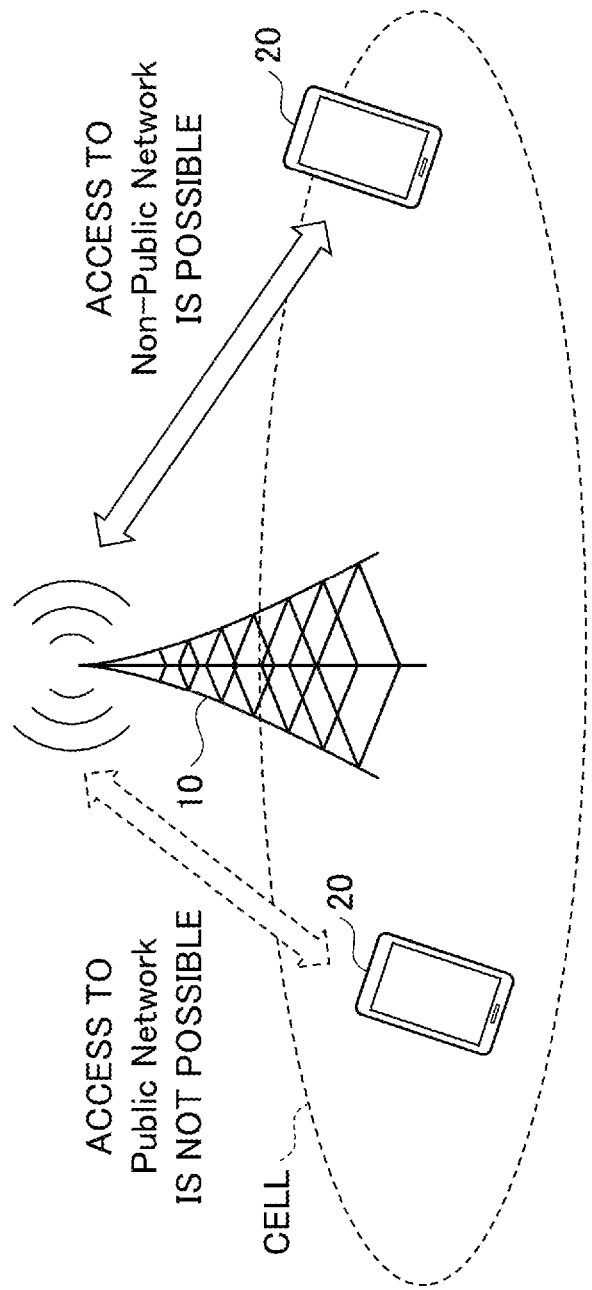
FIG. 2 is a diagram for describing an example (1) of an NPN in an embodiment of the present invention.

FIG. 2 is a diagram for describing an example (1) of the NPN in an embodiment of the present invention. FIG. 2 illustrates an example of the standalone non-public network. All the user equipments 20 illustrated in FIG. 2 are approved to establish a connection with the non-public network through subscriber information. As illustrated in FIG. 2, the user equipment 20 can access the non-public network. On the other hand, in the standalone non-public network, as illustrated in FIG. 2, the user equipment 20 is unable to access the public network.

Figure 3:
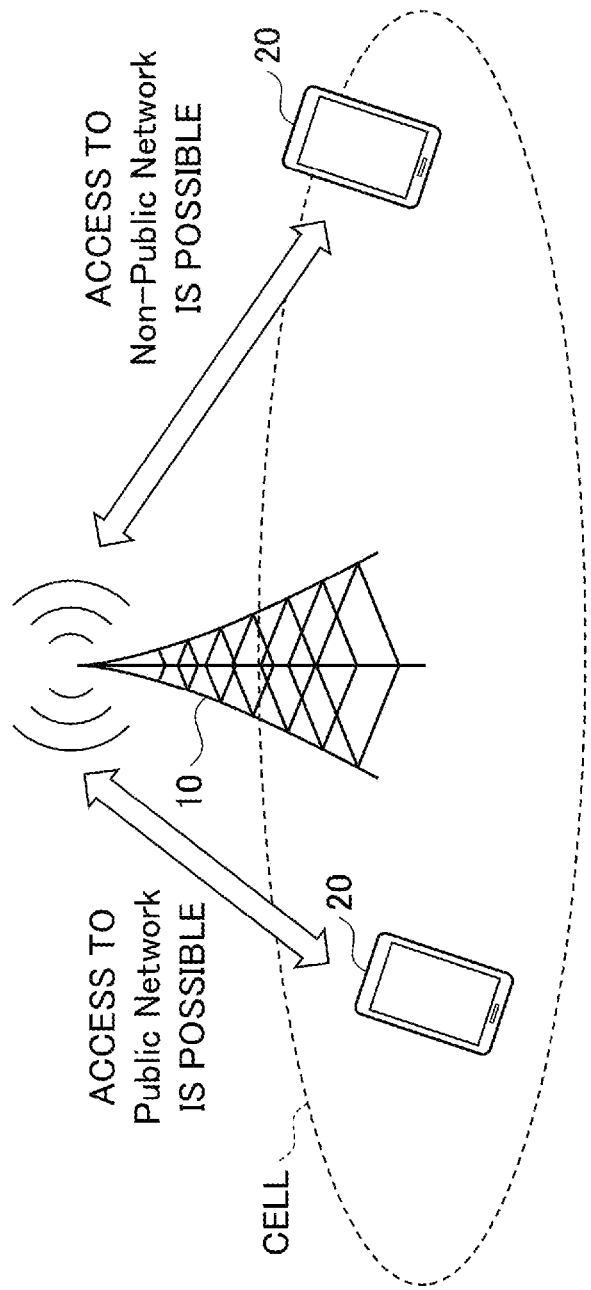
FIG. 3 is a diagram for describing an example (2) of an NPN in an embodiment of the present invention.

FIG. 3 is a diagram for describing an example (2) of the NPN in an embodiment of the present invention. FIG. 3 illustrates an example in which the public network and the non-public network are integrated. All the user equipment 20 illustrated in FIG. 3 are approved to establish a connection with the non-public network through subscriber information. As illustrated in FIG. 3, the user equipment 20 can access the non-public network. Further, as illustrated in FIG. 3, the user equipment 20 can also access the public network.

In a case in which a public network and a non-public network are integrated, a closed access group (CAG) identifying a group of subscribers who are allowed to access an associated cell may be used. The CAG has a unique identifier in the PLMN, and one or more CAG IDs are broadcast in a cell corresponding to the CAG.

The cell corresponding to the SNPN or the CAG has a function of supporting the SNPN or the CAG, and only the user equipment 20 having subscriber information of the SNPN or the CAG can establish a connection with the cell. On the other hand, for example, a legacy UE that does not support the SNPN or the CAG, or a UE that does not have the subscriber information of the SNPN or the CAG is unable to access the cell corresponding to the SNPN or the CAG. Therefore, in the cell corresponding to the SNPN or the CAG, it is desirable that only the user equipment 20 having the function of supporting the SNPN or the CAG and having the SNPN or the CAG subscriber information can be located, and that the other user equipments 20 are barred from accessing the cell corresponding to the SNPN or the CAG, but such control is unable to be performed by the related art.

Figure 4:
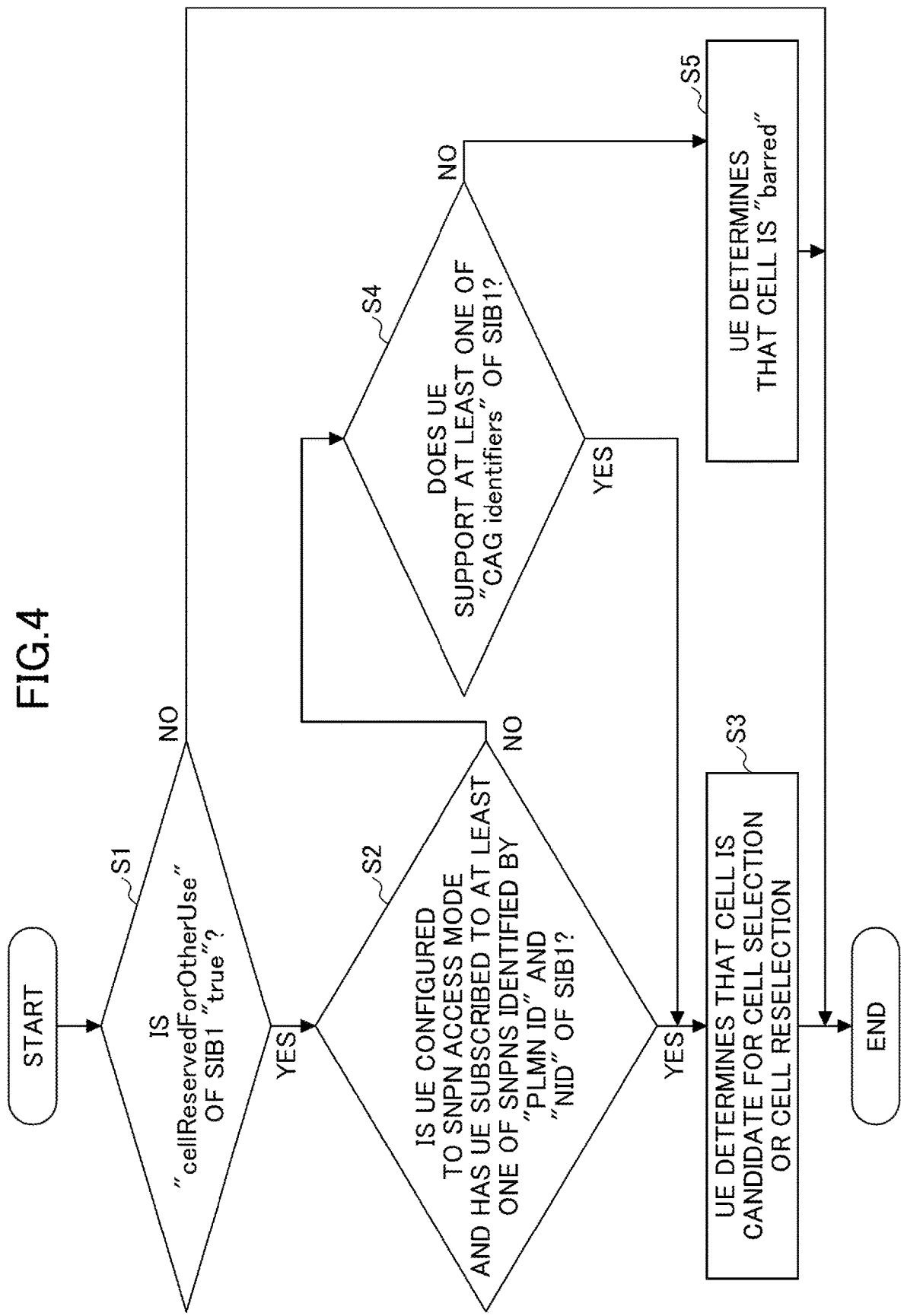
FIG. 4 is a sequence diagram for describing an operation example of a user equipment 20 in an embodiment of the present invention.

FIG. 4 is a sequence diagram for describing an operation example of the user equipment 20 in an embodiment of the present invention. An operation example of the user equipment 20 when, in the cell corresponding to the SNPN or the CAG, only the user equipment 20 having the function of supporting the SNPN or the CAG and having the SNPN or the CAG subscriber information can be located, and the other user equipments 20 be barred from accessing the cell corresponding to the SNPN or the CAG will be described with reference to FIG. 4.

In step S1, the user equipment 20 receives a system information block 1 (SIB1) which is system information broadcast in a certain cell, and determines whether or not an information element "cellReservedForOtherUse" included in the SIB1 is "true". If it is "true" (YES in S1), the process proceeds to step S2, and if it is not "true" (NO in S1), the flow ends.

In step S2, the user equipment 20 determines whether or not it is set to an SNPN access mode, and has subscribed to at least one of SNPNs identified by information elements "PLMN ID" and "NID" included in the SIB1. In a case in which the user equipment 20 has subscribed to at least one of SNPNs (YES in S2), the process proceeds to step S3, and in a case in which the user equipment 20 has not subscribed to the SNPNs (NO in S2), the process proceeds to step S4.

The SNPN access mode is a wireless communication access mode in which the user equipment 20 selects only the SNPN. "PLMN ID" is an identifier of the PLMN. "NID" is an identifier identifying the SNPN in combination with "PLMN ID". A human identifiable network name (for example, a character string) may be set in "NID". The human identifiable network name may be displayed when the SNPN is manually selected. A plurality of "NIDs" may be included in the SIB1.

In step S3, the user equipment 20 determines the cell in which the SIB1 is received in step S1 as a candidate for cell selection or cell reselection, and ends the flow.

On the other hand, in step S4, the user equipment 20 determines whether or not at least one of information elements "CAG identifier" included in the SIB1 is supported. In a case in which it is supported (YES in S4), the proceed to step S3, and in a case in which it is not supported, the proceed to step S5. A plurality of information elements "CAG identifiers" may be included in the SIB1. The support for "CAG identifier" may mean subscribing to the CAG or associated non-public network.

In step S5, the user equipment 20 determines that the cell from which the SIB1 is received in step S1 is "barred" and ends the flow.

In a case in which the user equipment 20 determines that the cell in which the SIB1 is received is a candidate for cell selection or cell reselection in step S3, the user equipment 20 may initiate access to the cell in which the SIB1 is received. Also, in a case in which the user equipment 20 determines that the cell in which the SIB1 is received is "barred" in step S5, the user equipment 20 may search for other cells without accessing the cell in which the SIB1 is received.

According to the above embodiment, the user equipment 20 can access the cell that supports the SNPN or the CAG only in a case in which the user equipment 20 has a capability of supporting the SNPN or the CAG and has the subscriber information of the SNPN or the CAG. Further, in a case in which the user equipment 20 does not have the capability of supporting the SNPN or the CAG or does not have the subscriber information of the SNPN or the CAG, the cell that supports the SNPN or the CAG can be set as being barred.

In other words, in the wireless communication system, it is possible to perform the access restrictions on the cell that supports non-public networks.

Device Configuration

Next, function configuration examples of a base station device 10 and a user equipment 20 that execute the processes and the operations described above will be described. The base station device 10 and the user equipment 20 have functions for implementing the embodiments described above. However, each of the base station device 10 and the user equipment 20 may have only some of the functions in the embodiment.

Base Station Device 10

Figure 5:
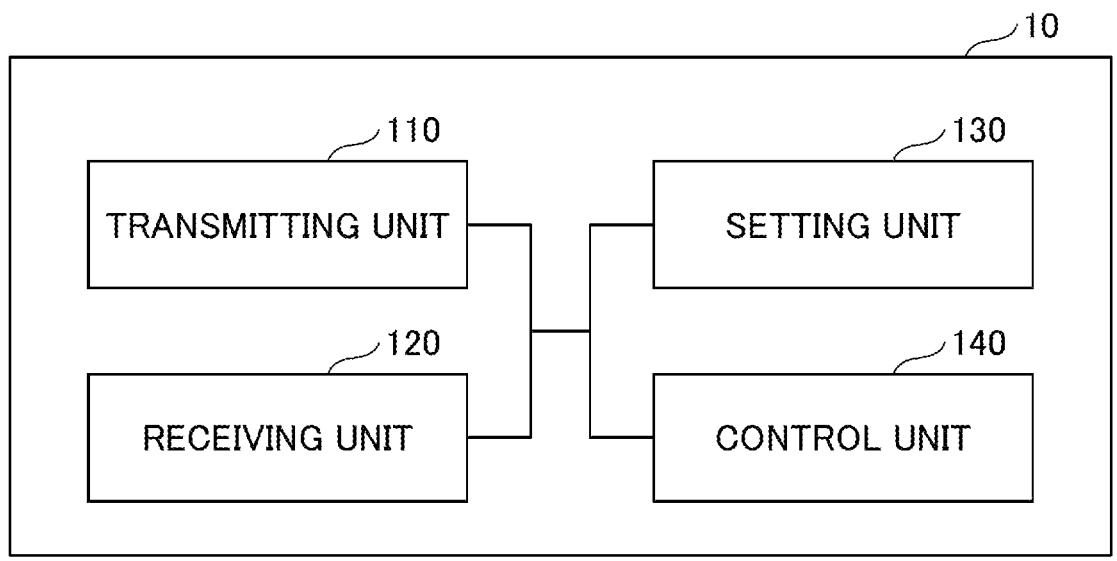
FIG. 5 is a diagram illustrating an example of a functional configuration of a base station device 10 in an embodiment of the present invention.

FIG. 5 is a diagram illustrating an example of a functional configuration of the base station device 10. As illustrated in FIG. 5, the base station device 10 includes a transmitting unit 110, a receiving unit 120, a setting unit 130, and a control unit 140. The functional configuration illustrated in FIG. 5 is only an example. A functional classification and names of the functional unit may be any classification and any names as long as the operation according to an embodiment of the present invention can be executed.

The transmitting unit 110 includes a function of generating a signal to be transmitted to the user equipment 20 side and transmitting the signal wirelessly. The receiving unit 120 includes a function of receiving various kinds of signals transmitted from the user equipment 20 and acquiring, for example, higher layer information from the received signals. The transmitting unit 110 also has a function of transmitting NR-PSS, NR-SSS, NR-PBCH, DL/UL control signals, or the like to the user equipment 20.

The setting unit 130 stores various kinds configuration information configured in advance and various kinds of configuration information to be transmitted to the user equipment 20 in a storage device, and reads out them from the storage device if necessary. For example, content of the configuration information is a configuration related to the cell access restrictions.

As described in the embodiment, the control unit 140 performs a process related to the cell access restriction. The functional unit related to signal transmission in the control unit 140 may be included in the transmitting unit 110, and the functional unit related to signal reception in the control unit 140 may be included in the receiving unit 120.

User Equipment 20

Figure 6:
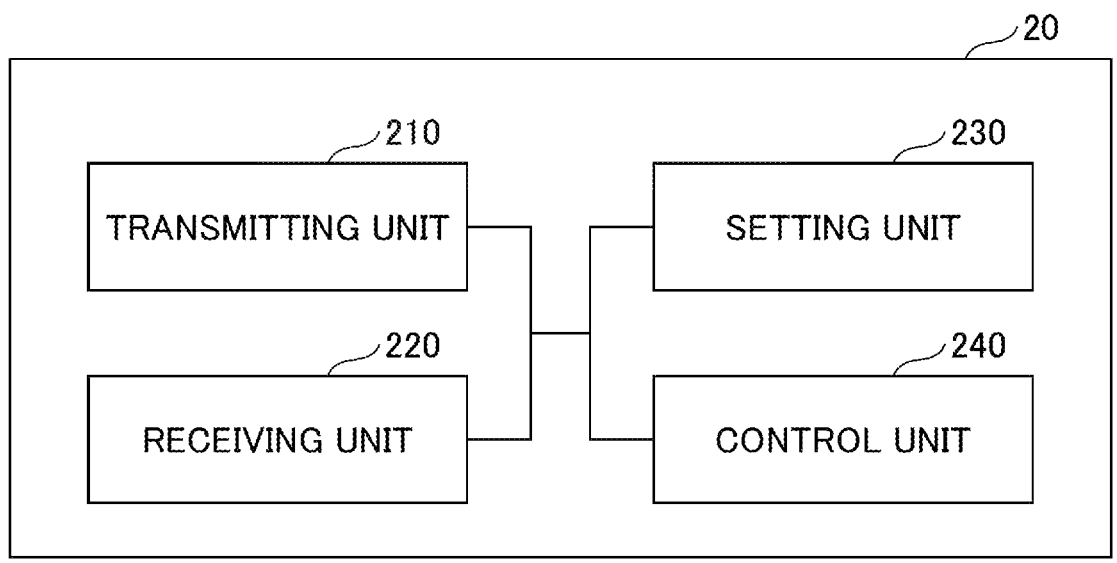
FIG. 6 is a diagram illustrating an example of a functional configuration of a user equipment 20 in an embodiment of the present invention.

FIG. 6 is a diagram illustrating an example of a functional configuration of the user equipment 20. As illustrated in FIG. 6, the user equipment 20 includes a transmitting unit 210, a receiving unit 220, a setting unit 230, and a control unit 240. The functional configuration illustrated in FIG. 6 is only an example. A functional classification and names of the functional unit may be any classification and any names as long as the operation according to an embodiment of the present invention can be executed.

The transmitting unit 210 generates a transmission signal from transmission data and transmits the transmission signal wirelessly. The receiving unit 220 wirelessly receives various kinds of signals and acquires higher layer signals from received physical layer signals. The receiving unit 220 includes a function of receiving NR-PSS, NR-SSS, NR-PBCH, and DL/UL/SL control signals or the like transmitted from the base station device 10. Further, for example, the transmitting unit 210 transmits a physical sidelink control channel (PSCCH), a physical sidelink shared channel (PSSCH), a physical sidelink discovery channel (PSDCH), a physical sidelink broadcast channel (PSBCH), and the like to other user equipment 20 as D2D communication, and the receiving unit 120 receives PSCCH, PSSCH, PSDCH, PSBCH, and the like from other user equipment 20.

The setting unit 230 stores various kinds of configuration information received from the base station device 10 or the user equipment 20 by the receiving unit 220 in a storage device, and reads out them from the storage device if necessary. The setting unit 230 also stores configuration information configured in advance. For example, content of the configuration information is a configuration related to the cell access restrictions.

As described in the embodiment, the control unit 240 controls cell selection based on the information related to the cell access restrictions acquired from the base station device 10. The functional unit related to signal transmission in the control unit 240 may be included in the transmitting unit 210, and the functional unit related to signal reception in the control unit 240 may be included in the receiving unit 220.

Hardware Configuration

In the block diagrams (FIGS. 5 and 6) used for the description of the embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically or logically combined or may be implemented by a plurality of devices, that is, two or more devices which are physically and/or logically separated and are directly or indirectly connected (for example, a wired and/or wireless manner). The function block may be implemented by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expectation, regarding, broadcasting, notifying, communicating, forwarding, configuring, reconfiguring, allocating, mapping, assigning, and the like but are not limited thereto. For example, a functional block (configuring unit) that causes transmission to function is referred to as a transmitting unit or a transmitter. In any case, as described above, an implementation method is not particularly limited.

Figure 7:
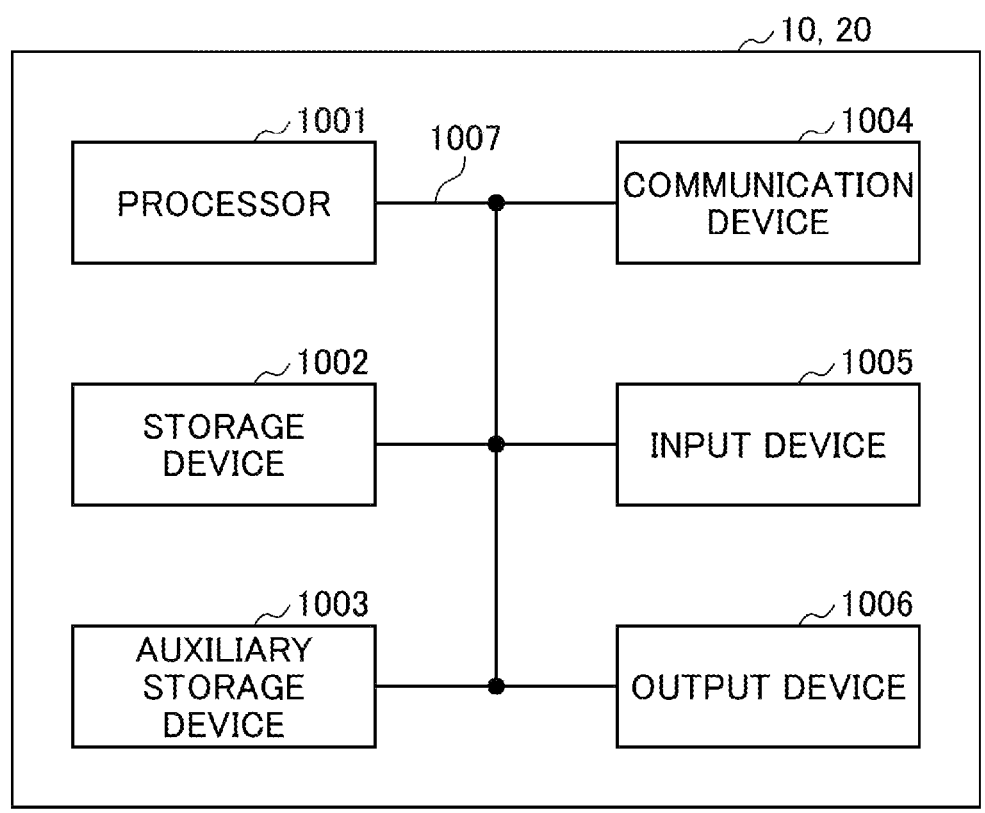
FIG. 7 is a diagram illustrating an example of a hardware configuration of the base station device 10 or the user equipment 20 in an embodiment of the present invention.

For example, the base station device 10, the user equipment 20, or the like in one embodiment of the present disclosure may function as a computer for processing the present disclosure's wireless communication method. FIG. 7 is a diagram illustrating an example of a hardware configuration of the base station device 10 and the user equipment 20 according to an embodiment of the present disclosure. Each of the base station device 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station device 10 and the user equipment 20 may be configured to include one or more devices illustrated in the drawing or may be configured without including some devices.

Each function in each of the base station device 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the control unit 140, the control unit 240, and the like described above may be implemented by the processor 1001.

Further, the processor 1001 reads a program (program code), a software module, or data from at least one of the auxiliary storage device 1003 and/or the communication device 1004 out to the storage device 1002, and executes various types of processes according to them. A program causing a computer to execute at least some of the operations described in the above embodiment is used as the program. For example, the control unit 140 of the base station device 10 illustrated in FIG. 5 may be implemented by a control program which is stored in the storage device 1002 and operates on the processor 1001. Further, for example, the control unit 240 of the user equipment 20 illustrated in FIG. 6 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register", a "cache", a "main memory", or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be, for example, a database, a server, or any other appropriate medium including at least one of the storage device 1002 and the auxiliary storage device 1003.

The communication device 1004 is hardware (a transceiving device) for performing communication between computers via at least one of a wired network and a wireless network and is also referred to as a "network device", a "network controller", a "network card", a "communication module", or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting/receiving unit, a transmission line interface, or the like may be implemented by the communication device 1004. The transmitting/receiving unit may be implemented by to be physically or logically separated by a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. The input device 1005 and the output device 1006 may be integrated (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station device 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented using at least one of these pieces of hardware.

Conclusion of Embodiment

As described above, according to an embodiment of the present invention, a user equipment including a receiving unit configured to receive system information from a cell, a control unit configured to determine, based on an information element and identifiers, whether or not the cell is a candidate to be selected, the information element indicating other uses included in the system information and identifiers being of a plurality of closed access groups (CAGs) identifying groups of subscribers who are allowed to access the cell, and a communication unit that performs access to the cell in a case in which the control unit determines that the cell is the candidate to be selected is provided.

With the above configuration, the user equipment 20 can access the cell that supports CAG only when the user equipment 20 has the capability of supporting the CAG and has the subscriber information of the CAG. Further, in a case in which the user equipment 20 does not have the capability of supporting the CAG or does not have the subscriber information of the CAG, the cell that supports the CAG can be set as being barred. In other words, in the wireless communication system, it is possible to perform the access restrictions on the cell that supports non-public networks.

When the information element indicating other uses is true, the control unit may identify a plurality of non-public networks based on a combination of the identifiers of the plurality of CAGs. With this configuration, in a case in which the user equipment 20 does not have the capability of supporting the CAG, the user equipment 20 can avoid processing of identifying the CAG.

The control unit may determine that the cell is the candidate to be selected only when the user equipment has subscriber information of at least one non-public network among the plurality of non-public networks identified based on the identifiers of the plurality of CAGs identifying the groups of the subscribers who are allowed to access the cell. With this configuration, the user equipment 20 can select a cell only when the user equipment 20 has the subscriber information of the CAG.

The control unit may determine that the cell is barred from being accessed when the user equipment has no subscriber information of the plurality of non-public networks identified based on the identifiers of the plurality of CAGs identifying the groups of the subscribers who are allowed to access the cell. With this configuration, in a case in which the user equipment 20 does not have the subscriber information of the CAG, the cell can be determined to be barred.

The control unit may determine that the cell is barred from being accessed when the information element indicating other uses is not true. With this configuration, the user equipment 20 can determine that the cell is barred from being accessed in a case in which the user equipment 20 does not have the capability of supporting the CAG.

Supplement of Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station device 10 and the user equipment 20 have been described using the functional block diagrams, but such devices may be implemented by hardware, software, or a combination thereof. Software executed by the processor included in the base station device 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Further, an indication of information is not limited to the aspect or embodiment described in the present disclosure and may be given by any other method. For example, the indication of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB))), other signals, or a combination thereof. Further, the RRC signaling may be referred to as an RRC message and may be, for example, an RRC connection setup message, an RRC connection reconfiguration message, or the like.

Each aspect and embodiment of the present invention may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system using any other appropriate system, and next generation systems extended based on these standards. Further, a plurality of systems may be combined and applied (for example, a combination of at least one of LTE and LTE-A and 5G or the like).

The processing procedures, the sequences, the flowcharts, and the like of the respective aspects/embodiments described in this specification may be reversed in order unless there is a contradiction. For example, the method described in the present disclosure presents elements of various steps using an exemplary order and is not limited to a presented specific order.

In this specification, a specific action that is supposed to be performed by the base station device 10 may be performed by an upper node in some cases. In the network including one or more network nodes including the base station device 10, various operations performed for communication with the user equipment 20 can be obviously performed by at least one of the base station and any network node (for example, an MME, an S-GW, or the like is considered, but it is not limited thereto) other than the base station device 10 and/or the base station device 10. The example in which the number of network nodes excluding the base station device 10 is one has been described above, but other network nodes in which a plurality of other network nodes (for example, an MME and an S-GW) are combined may be provided.

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination of the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a website, a server, or any other remote source using at least one of a wired technology (such as a coaxial cable, a fiber optic cable, a twisted pair, or a digital subscriber line (DSL)) and a radio technology (such as infrared rays or a microwave), at least one of the wired technology and the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC) may be referred to as a "carrier frequency", a "cell", or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names allocated to the various channels and the information elements are not limited in any respect.

In the present disclosure, the terms "base station (BS)", "radio base station", "base station device", "fixed station", "Node B", "eNode B (eNB) gNodeB (gNB)", "access point", "transmission point", "reception point", "transmission/reception point", "cell", "sector", "cell group", "carrier", "component carrier", and the like can be used interchangeably. The base stations may also be indicated by terms such as a macro cell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)", "user terminal", "user equipment (UE)", "terminal", and the like can be used interchangeably.

The mobile station may be a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, handset, user agent, mobile client, client, or may be referred to by some other suitable term.

At least one of the base station and the mobile station may be also referred to as a transmitting device, a receiving device, a communication device, or the like. At least one of the base station and the mobile station may be a device installed in a mobile body, a mobile body itself, or the like. The moving body may be a vehicle (for example, a car, an airplane, or the like), a moving body that moves unmanned (for example, a drone, an autonomous car or the like), or a robot (manned type or unmanned type). At least one of the base station and the mobile station includes a device which need not necessarily move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of user equipment 20 (for example, which may be referred to as device-to-device (D2D) or vehicle-to-everything (V2X)). In this case, the user equipment 20 may have the functions of the base station device 10 described above. Further, the terms "uplink" and "downlink" may be replaced with terms (for example, "side") corresponding to inter-terminal communication. For example, an uplink channel, a downlink channel, or the like may be read by side channels.

Similarly, the user terminal in the present disclosure may be replaced with the base station. In this case, the base station may have the functions of the above-mentioned user terminal.

The terms "determining" and "deciding" used in this specification may include a wide variety of actions. For example, "determining" and "deciding" may include, for example, events in which events such as judging, calculating, computing, processing, deriving, investigating, looking up, search, and inquiry (for example, looking up in a table, a database, or another data structure), or ascertaining are regarded as "determining" or "deciding". Further, "determining" and "deciding" may include, for example, events in which events such as receiving (for example, receiving information), transmitting (for example, transmitting information), input, output, or accessing (for example, accessing data in a memory) are regarded as "determining" or "deciding". Further, "determining" and "deciding" may include, for example, events in which events such as resolving, selecting, choosing, establishing, or comparing are regarded as "determining" or "deciding". In other words, "determining" and "deciding" may include events in which a certain operation is regarded as "determining" or "deciding". Further, "determining (deciding)" may be replaced with "assuming", "expecting", "considering", or the like.

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connection" may be replaced with "access". In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based on only" unless otherwise stated. In other words, a phrase "based on" means both "based on only" and "based on at least".

Any reference to an element using a designation such as "first", "second", or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Further, "means" in the configuration of each of the above devices may be replaced with "unit", "circuit", "device", or the like.

In a case in which "include", "including", and variations thereof are used in the present disclosure, these terms are intended to be comprehensive, similarly to a term "comprising". Further, the term "or" used in the present disclosure is intended not to be an exclusive disjunction.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different designations respectively corresponding to them may be used.

For example, one subframe may be referred to as a transmission time interval (TTI: Transmission Time Interval), or a plurality of consecutive subframes may be referred to as TTIs, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in wireless communication. For example, in the LTE system, the base station performs scheduling of allocating a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Further, when a TTI is given, a time interval (for example, the number of symbols) in which a transport block, a code block, a code word, or the like is actually mapped may be shorter than the TTI.

Further, when one slot or one mini slot is referred to as a TTI, one or more TTIs (that is, one or more slots or one or more mini slots) may be a minimum time unit of scheduling. Further, the number of slots (the number of mini slots) constituting the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Further, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be decided based on a numerology.

Further, a time domain of an RB may include one or more symbols and may be a length of one slot, one mini slot, one subframe, or one TTI. Each of one TTI, one subframe, or the like may be constituted by one or more resource blocks.

Further, one or more RBs may be referred to as a physical resource block (PRB), a subcarrier group (SCG), a resource element group (REG), a PRB pair, an RB pair, or the like.

Further, the resource block may be constituted by one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell", a "carrier", or the like in the present disclosure may be replaced with a "BWP".

Structures of the radio frame, the subframe, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a", "an", or "the" in English is added by a translation, the present disclosure may include a case in which a noun following the article is plural.

In the present disclosure, a wording "A and B are different" may mean "A and B are different from each other". Further, the wording may mean "each of A and B is different from C". Terms such as "separated", "coupled", or the like may also be interpreted similarly to "different".

Each aspect/embodiment described in this specification may be used alone, in combination, or may be switched in accordance with the execution. Further, indication of predetermined information (for example, indication of "being X") is not limited to being performed explicitly, but may be performed implicitly (for example, not indicating the predetermined information).

In the present disclosure, the transmitting unit 210 and the receiving unit 220 are examples of communication units. The transmitting unit 110 and the receiving unit 120 are examples of communication units. "cellReservedForOtherUse" is an example of an information element indicating other uses. PLMN ID is an example of the PLMN identifier. NID is an example of the network identifier.

Although the present disclosure has been described above in detail, it is obvious to those skilled in the art that the present disclosure is not limited to the embodiments described in the present disclosure. The present disclosure may be implemented as revised and modified forms without departing from the gist and scope of the present disclosure as described in the claims. Therefore, the description of the present disclosure is for the purpose of illustration and does not have any restrictive meaning to the present disclosure.

Explanations of Letters or Numerals

10 BASE STATION DEVICE
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver configured to receive, from a base station, system information including:
an information element indicating other uses; and
an identifier of a closed access group (CAG) identifying a group of subscribers allowed to access a cell; and
a processor configured to determine that the cell is a candidate for cell selection and cell reselection, when the information element is true and the terminal subscribes to the group of subscribers allowed to access the cell associated with the identifier of the CAG,
wherein when the information element is true and the terminal does not have capability of supporting a non-public network (NPN), the processor determines that the cell is barred.

2. The terminal according to claim 1, wherein the processor accesses the cell in a case where the terminal has subscriber information corresponding to the identifier of the CAG.

3. The terminal according to claim 1, wherein the processor determines that the cell is barred from being accessed in a case where the information element indicating other uses included in the system information is true and the terminal does not have capability of supporting the NPN.

4. A communication system comprising: a terminal; and a base station, wherein
the terminal includes
a receiver configured to receive, from a base station, system information including:
an information element indicating other uses; and
an identifier of a closed access group (CAG) identifying a group of subscribers allowed to access a cell; and
a processor configured to determine that the cell is a candidate for cell selection and cell reselection, when the information element is true and the terminal subscribes to the group of subscribers allowed to access the cell associated with the identifier of the CAG,
wherein when the information element is true and the terminal does not have capability of supporting a non-public network (NPN), the processor determines that the cell is barred; and the base station includes
a transmitter configured to transmit, to the terminal, the system information including the identifier of the CAG identifying the group the subscribers and the information element indicating other uses.

5. A communication method performed by a terminal, the method comprising:
receiving, from a base station, system information including:
an information element indicating other uses; and
an identifier of a closed access group (CAG) identifying a group of subscribers allowed to access a cell; and
determining that the cell is a candidate for cell selection and cell reselection, when the information element is true and the terminal subscribes to the group of subscribers allowed to access the cell associated with the identifier of the CAG,
wherein when the information element is true and the terminal does not have capability of supporting a non-public network (NPN), a processor of the terminal determines that the cell is barred.

* * * * *